(12) United States Patent
Rosedale

(10) Patent No.: US 12,112,118 B2
(45) Date of Patent: Oct. 8, 2024

(54) METHODS FOR EXTENDING VECTOR-BASED DOCUMENT EMBEDDING MODELS AND SYSTEMS THEREOF

(71) Applicant: Julia M Rosedale, Bala Cynwyd, PA (US)

(72) Inventor: Julia M Rosedale, Bala Cynwyd, PA (US)

(*) Notice: Subject to any disclaimer, the term of this patent is extended or adjusted under 35 U.S.C. 154(b) by 59 days.

(21) Appl. No.: 18/156,910

(22) Filed: Jan. 19, 2023

(65) Prior Publication Data

US 2023/0229847 A1   Jul. 20, 2023

Related U.S. Application Data

(60) Provisional application No. 63/300,906, filed on Jan. 19, 2022.

(51) Int. Cl.
| | | |
|---|---|---|
| *G06F 17/00* | (2019.01) | |
| *G06F 40/103* | (2020.01) | |
| *G06F 40/284* | (2020.01) | |
| *G06F 40/30* | (2020.01) | |

(52) U.S. Cl.
CPC .......... *G06F 40/103* (2020.01); *G06F 40/284* (2020.01); *G06F 40/30* (2020.01)

(58) Field of Classification Search
CPC ...... G06F 40/103; G06F 40/284; G06F 40/30; G06F 40/216; G06F 40/289
See application file for complete search history.

(56) References Cited

U.S. PATENT DOCUMENTS

| | | | | |
|---|---|---|---|---|
| 7,716,216 B1* | 5/2010 | Harik | ...................... | G06F 16/34 |
| | | | | 707/724 |
| 7,912,705 B2* | 3/2011 | Wasson | .................. | G06F 40/169 |
| | | | | 715/256 |
| 8,631,027 B2* | 1/2014 | Patterson | .............. | G06F 16/313 |
| | | | | 707/723 |
| 8,751,218 B2* | 6/2014 | Dang | ...................... | G06F 40/30 |
| | | | | 706/55 |
| 8,983,963 B2* | 3/2015 | Fittges | .................. | G06F 16/353 |
| | | | | 707/739 |
| 9,928,234 B2* | 3/2018 | Kolotienko | ........... | G06F 40/211 |
| 10,671,816 B1* | 6/2020 | Zhang | ...................... | G06F 40/30 |
| 11,205,053 B2* | 12/2021 | Contreras | ............... | G06F 40/40 |
| 11,977,845 B2* | 5/2024 | Lyske | ........................ | G06F 8/75 |
| 2011/0066585 A1* | 3/2011 | Subrahmanyam | ....... | G06N 7/01 |
| | | | | 706/52 |
| 2017/0132205 A1* | 5/2017 | Novitskiy | ............. | G06F 40/284 |

(Continued)

FOREIGN PATENT DOCUMENTS

| | | | | |
|---|---|---|---|---|
| CN | 107145479 A | * | 9/2017 | ............. G06F 40/14 |
| CN | 109471882 A | * | 3/2019 | ........... G06F 16/353 |

(Continued)

*Primary Examiner* — Laurie A Ries
(74) *Attorney, Agent, or Firm* — Jeffrey H. Rosedale

(57) ABSTRACT

The present invention provides natural language processing methods and systems for representing a document temporally in an arbitrary well-defined semantic space. The disclosed methods and systems operate by creating a Root Document Trace, which is a novel document-representing computational object in high-dimensional semantic space. Among many uses, the Root Document Trace can be used, for example, to evaluate narrative and argument structures within and between documents.

15 Claims, 8 Drawing Sheets

Initial Conditions and Anatomy of the Increment

(56) References Cited

U.S. PATENT DOCUMENTS

| | | | |
|---|---|---|---|
| 2018/0307857 A1* | 10/2018 | Beecham | G06F 16/9024 |
| 2019/0303452 A1* | 10/2019 | Tecu | G06F 16/148 |
| 2022/0229863 A1* | 7/2022 | Schwarz | G06F 40/30 |
| 2023/0351115 A1* | 11/2023 | Zeng | G06V 30/413 |

FOREIGN PATENT DOCUMENTS

| | | | | |
|---|---|---|---|---|
| CN | 110489752 A | * | 11/2019 | |
| WO | WO-2007075157 A1 | * | 7/2007 | G06F 16/24522 |
| WO | WO-2021252802 A1 | * | 12/2021 | G06F 16/213 |

* cited by examiner

FIG. 1 - Initial Conditions and Anatomy of the Increment
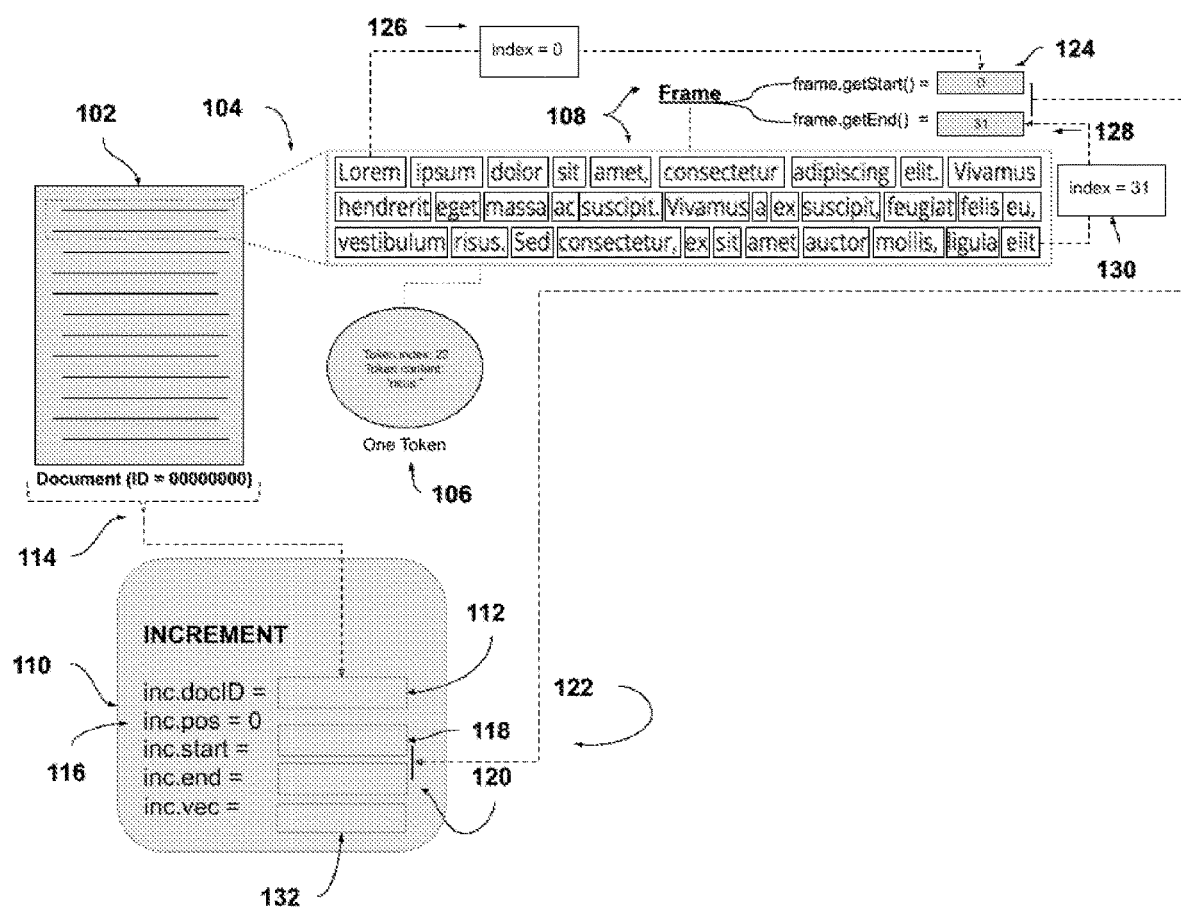

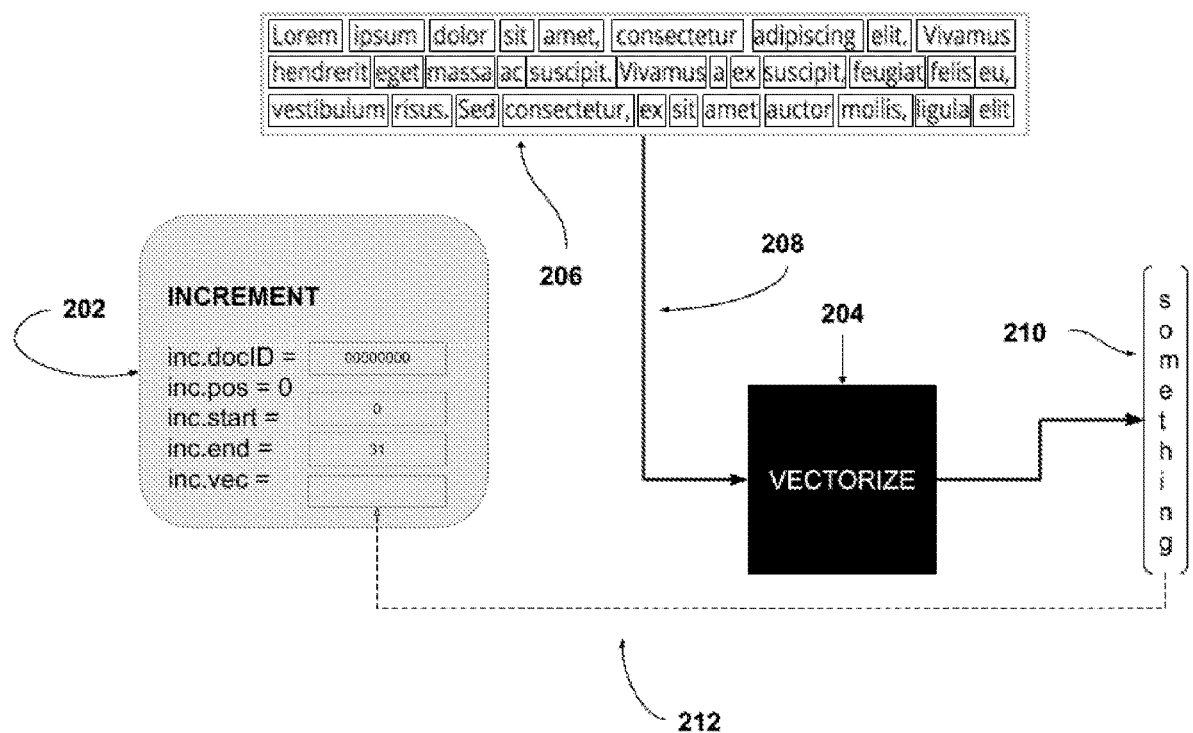
FIG. 2 - Vectorization

FIG. 3.1 - Frame Shift Detail
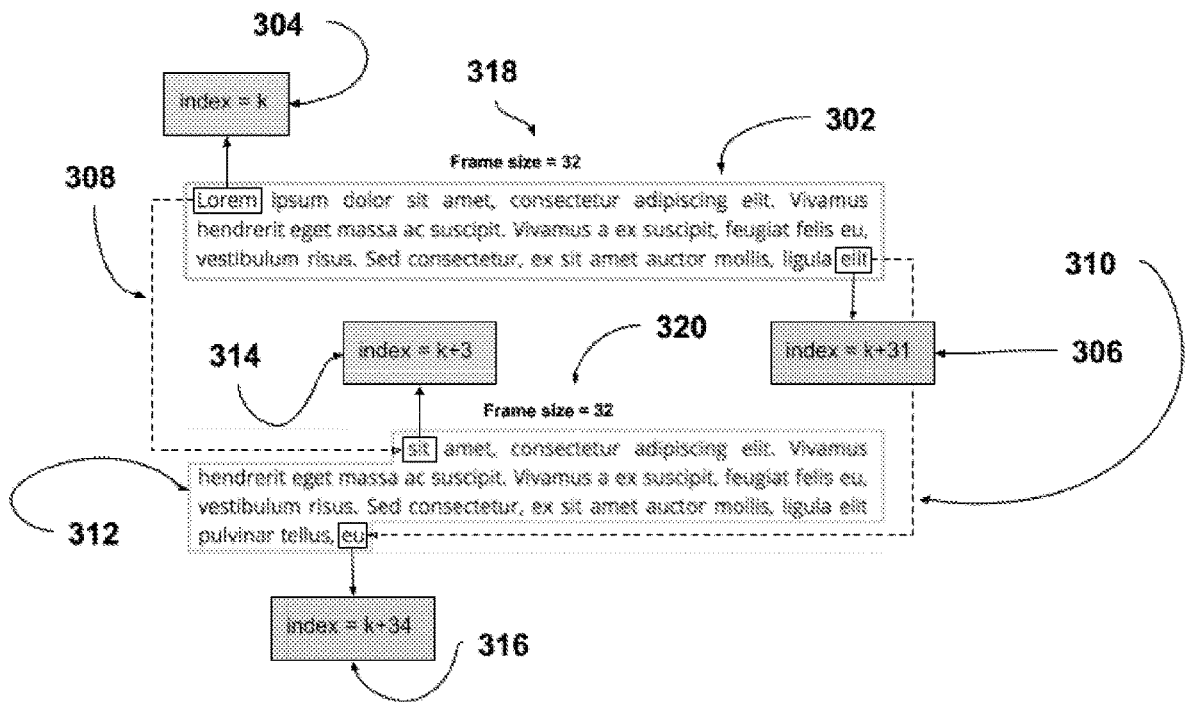
FIG. 3.2 - Frame Shift Overview
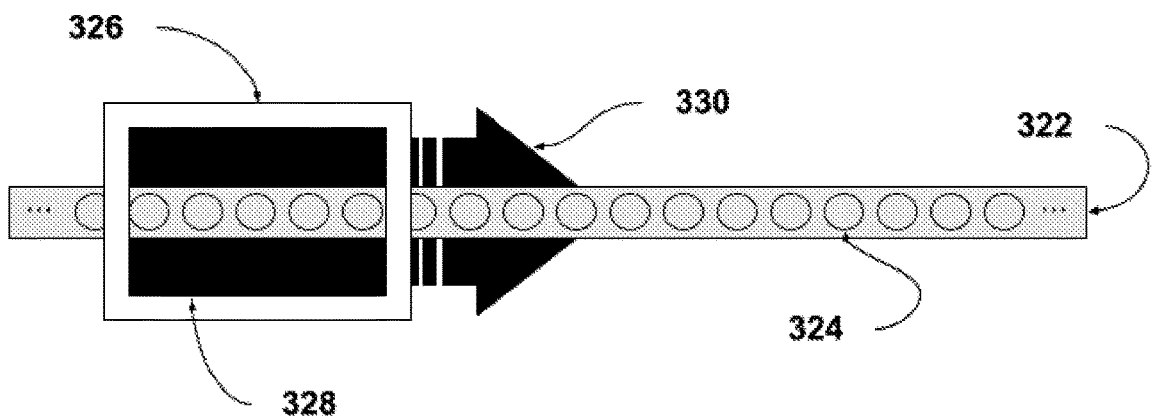

FIG. 4 - Repetition of Procedure
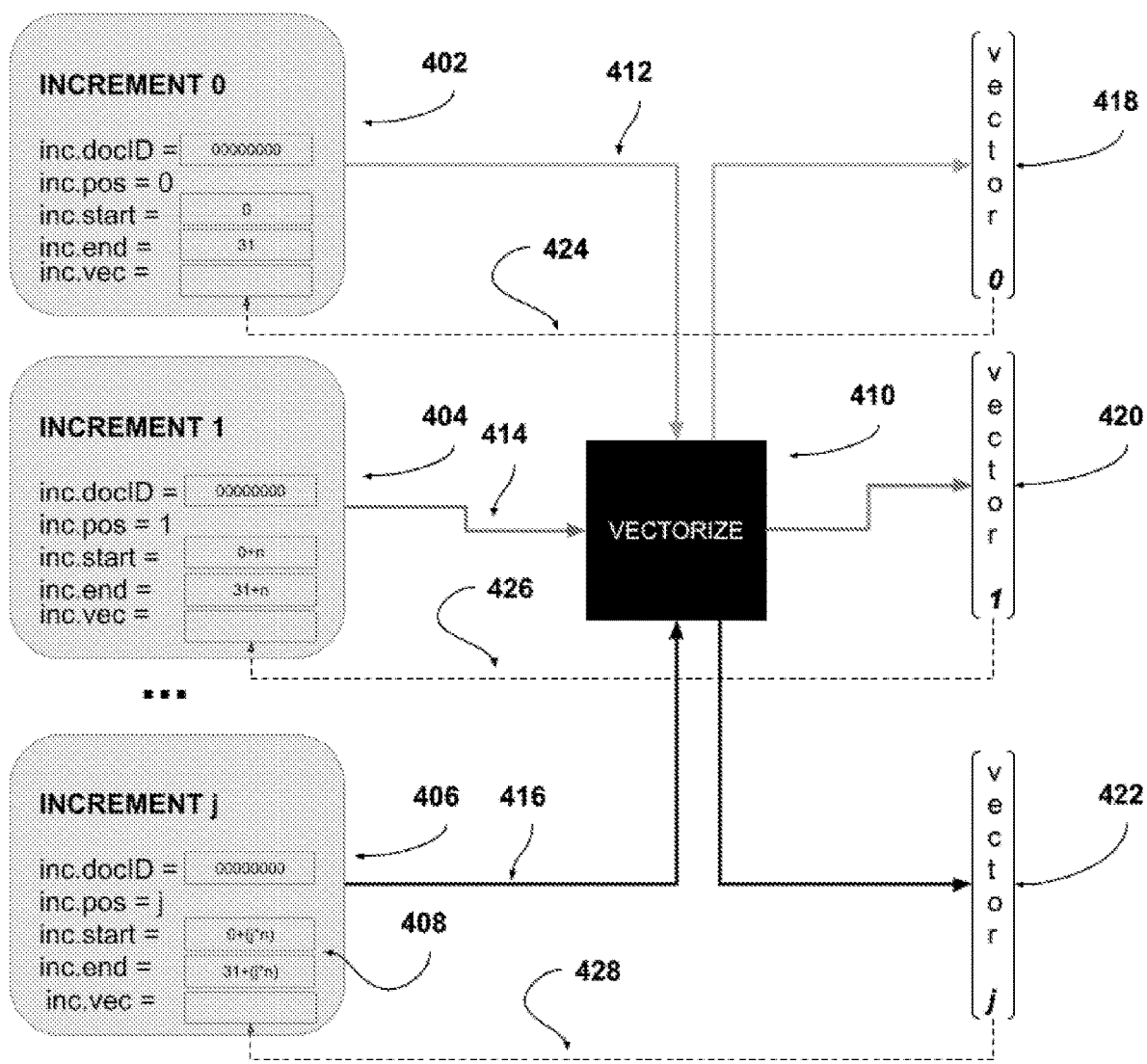

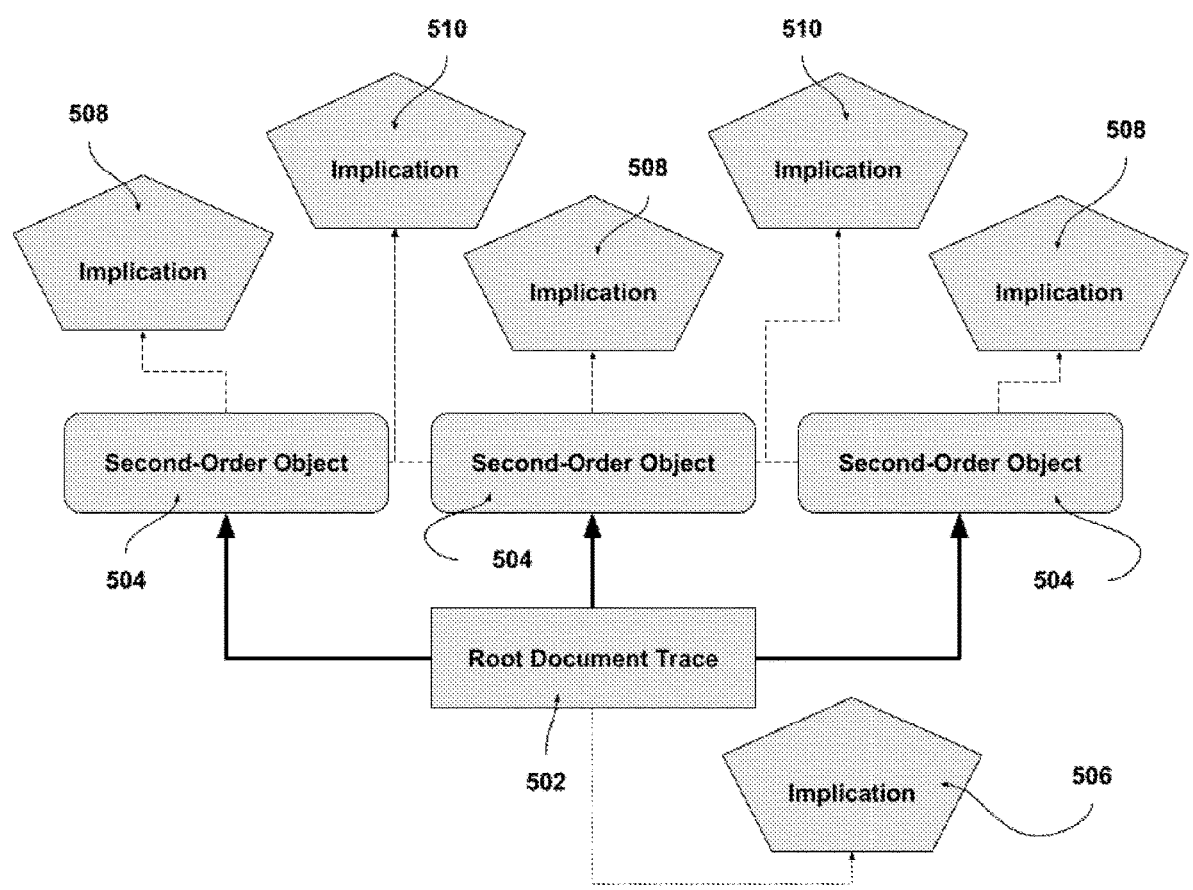
FIG. 5 - Root and Second-Order Objects

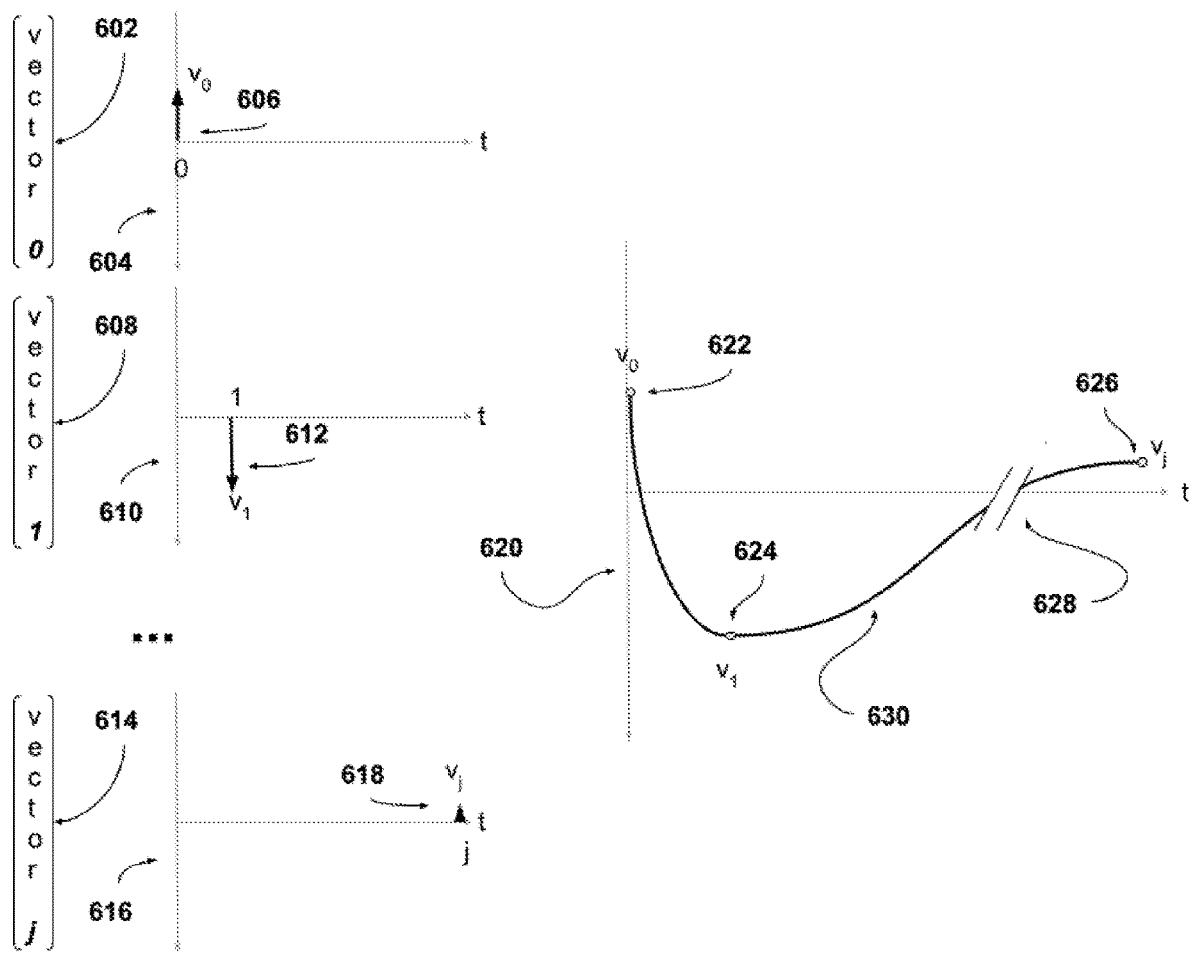
FIG. 6 - Drawing the Trace in k+1 Dimensions

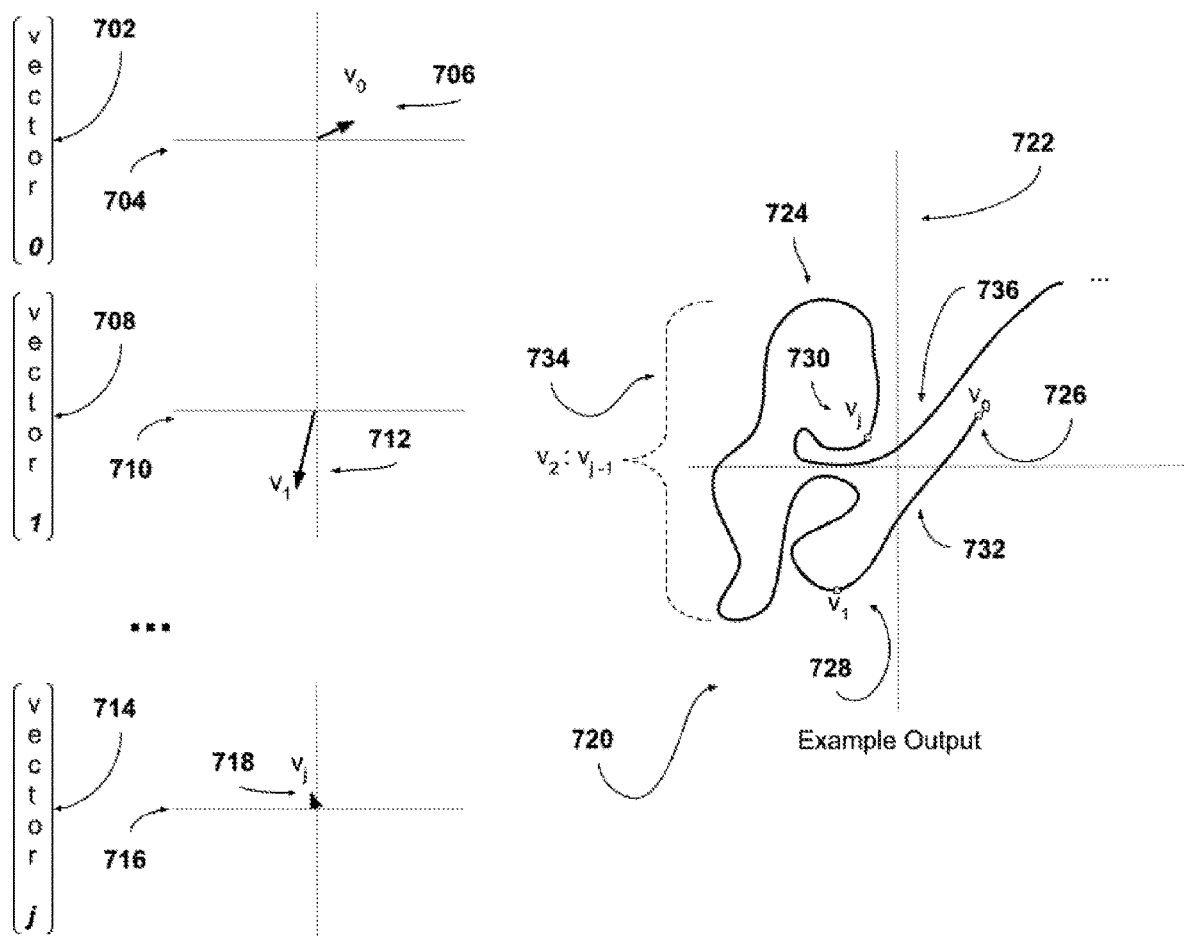
FIG. 7 - Drawing the Trace in k Dimensions

METHODS FOR EXTENDING VECTOR-BASED DOCUMENT EMBEDDING MODELS AND SYSTEMS THEREOF

CROSS-REFERENCE TO RELATED APPLICATIONS

This application claims the benefit of priority under 35 U.S.C. § 119(e) to U.S. Provisional Patent Application No. 63/300,906, filed on Jan. 19, 2022, and titled "Methods for Extending Vector-Based Document Embedding Models and Systems Thereof," the contents of which are incorporated by reference herein in their entirety for all purposes.

FIELD OF THE INVENTION

The disclosed invention is in the field of natural language processing.

BACKGROUND OF THE INVENTION

Natural language processing (NLP) of text-based information sources commonly makes use of a document encoder model to generate a document vector from a document. Such document encoder models may be trained to generate document vectors from a document as document embeddings to represent the features of the document. Until now, however, document embeddings have been treated largely as extensions of word embeddings: the aim being to capture the meaning, or semantic essence, of a document within a single dense vector of feature representations, which may or may not be explainable. When this vector is compared against other document and query vectors, it should produce semantically coherent, meaningful results.

Current approaches, which consider a document's content in aggregate, yield a comprehensive treatment of what a document is about, or the subject of the document. It has been shown that embeddings created in this fashion function reasonably well as semantic representations of their documents on the concept level, and operations performed thereupon—tasks usually involving classification—frequently yield useful results.

Unfortunately these approaches inherently neglect one of the most fundamental aspects of a document in their treatment thereof, effectively performing their computations upon a lossy compression of the object rather than upon the object itself. Unsurprisingly, computing upon such a compressed object limits what one can reasonably expect to achieve therein.

We—human beings—process sequential information sequentially. We can physically look at an entire document at once, but the process of reading it requires us to shift our attention incrementally, parsing the content piece by piece, changing our understanding of the "meaning" of the document over time. Critically, this cannot be faithfully split into temporal traces of individual words and phrases; our subjective reading experience at any given time is shaped by the entirety of our attentional frame, including the interactions between its constituent components.

Thus, there is a need to capture this change over time within our computational representation of a document. This allows for modes of analysis closed to the current standard, revealing a variety of novel questions in the document processing space. The disclosed inventions are directed to these and other important needs.

SUMMARY OF THE INVENTION

The present invention provides computer-implemented methods executed by one or more processors for representing a document in an arbitrary well-defined semantic space. As used herein, the term "methods" refers to computer-implemented methods executed by one or more processors.

The present invention provides, fundamentally, methods for representing a document as a bijection, henceforth referred to as a "Root Document Trace". Representing a document, especially a full text document, as a Root Document Trace has a variety of uses, for example, evaluating narrative and argument structures within and between documents and generating higher-order mathematical document representations quickly and efficiently. The inventive methods described herein generate a Root Document Trace from a text-based document for these and related uses.

In this regard, the present invention provides for methods for representing a document temporally in an arbitrary well-defined semantic space, comprising constructing an explicit bijection between a set of subsets of the nonnegative integers and a set of vectors in a semantic space.

As well, the present invention also provides for methods for representing a document temporally in an arbitrary well-defined semantic space, comprising: generating, by a text parser operating upon a plaintext document, an ordered list of tokens; defining, by a computational process, a frame object with assigned attributes and object methods; iteratively generating, by an increment generator using the frame object and the output of the text parser, a collection of increment objects possessing the same docID attribute value; and generating, from the collection of increment objects, an explicit bijection between a set of subsets of the nonnegative integers and a set of vectors in a semantic space, referred to as the Root Document Trace.

In a related embodiment of the present invention the semantic space is defined by an arbitrary vector generator. The choice of vector generator may be entirely arbitrary among the document and paragraph vector generators suited to the relevant language context.

In related embodiments the actual process of generating an increment object can be defined. For example, in some embodiments, the attributes of each increment object are calculated by an increment generator from the position of the frame object in relation to the ordered list of tokens. In some embodiments, the step of iteratively generating a collection of increment objects uses a consistent predetermined frame shift.

In other embodiments, a frame shift can be utilized within the process for representing a document temporally in an arbitrary well-defined semantic space.

Vector generators are used in various embodiments of the inventive processes. An increment generator uses a vector generator when calculating/assigning increment object attributes. Accordingly, the present invention also provides for methods wherein the attributes of each increment object are calculated by the increment generator, using a vector generator, from the position of the frame object in relation to the list of tokens.

In some embodiments it should be noted that the choice of vector generator can be somewhat arbitrary among the document and paragraph vector generators suited to the relevant language context.

In other embodiments it should be noted that the choice of vector generator can be somewhat important, thereby a specific class of vector generator can be used in the inventive processes. Accordingly, in the inventive methods as described herein, the semantic space can be defined by an arbitrary document or paragraph vector generator. In certain embodiments, it should be "grokkable", i.e., appreciated, that defining the semantic space by an arbitrary document or paragraph vector generator helps to remove any ambiguity of the phrase "vector generator" broadly referring to anything that generates vectors and to specify that a vector generator is being used to generate document or paragraph vectors.

Accordingly, the present invention also provides for computer-implemented methods executed by one or more processors for representing a document temporally in an arbitrary well-defined semantic space, the method comprising: generating, by a text parser operating upon a plaintext document, an ordered list of tokens, wherein the order of tokens in the list corresponds precisely to their order in the document, and each token in the list has content in the form of a string and index in the form of a non-negative integer; defining, by a computational process, a frame object with attributes start, end, and size, and methods for retrieving start, end, and size attributes and altering start and end attributes; iteratively generating, by an increment generator using the frame object and the output of the text parser, a collection of increment objects possessing the same docID attribute value; and generating, from the collection of increment objects, a Root Document Trace. In some embodiments, the Root Document Trace is an explicit bijection between a set of subsets of the nonnegative integers specified by the properties of the increment objects generated as described above and a set of vectors in the defined semantic space. In some embodiments, the semantic space is defined by an arbitrary vector generator. And in some embodiments, a function generator is used for generating, from the collection of increment objects, the Root Document Trace.

Accordingly, the present invention also provides for computer-implemented methods executed by one or more processors for generating a document-representing object in an arbitrary well-defined semantic space, the methods comprising: receiving, by a data processing system, a plaintext document in a specified language; and constructing an explicit bijection between a specified set of subsets of the nonnegative integers and a set of vectors in a semantic space. In some embodiments, the set of subsets of the nonnegative integers is defined by an iterative process performed upon the document. And in some embodiments, the semantic space is defined by an arbitrary document or paragraph vector generator suited to the specified language of the document.

The present invention also provides for computer-implemented methods executed by one or more processors for generating component parts used in constructing a Root Document Trace, which incorporate an iterative increment generation process. For example, the present invention provides for iterative processes to create component parts used in constructing a Root Document Trace, comprising: generating, by an increment generator, an empty increment object; assigning, by the increment generator, a predetermined document identification number to a docID attribute and a nonnegative integer value to a position attribute of the increment object, wherein the value of the position attribute is equal to the number of increment objects created prior to the current increment; capturing, by a frame object using the output of a text parser, a number of tokens equal to the size attribute of the frame object, wherein all and only those tokens with index between the start and end attributes of the frame object (inclusive) are included in the collection; generating, by an arbitrary predetermined document or paragraph vector generator using the captured tokens, a paragraph or document vector representing the captured text in semantic space, wherein the input to the vector generator is a string comprising the captured tokens in index order; assigning, by the increment generator, start and end attributes of the increment object corresponding to the start and end attributes of the frame object and a vector value to the vector attribute of the increment object, wherein the output of the vector generator determines the value of this attribute; updating, by the increment generator, the frame object start and end attributes, wherein each attribute increases by a constant positive integer value strictly less than the value of the frame size attribute; and determining, by the increment generator from the collection of increment objects, whether there is a need to generate an additional increment object, and optionally generating one additional increment object as specified by the increment generator. In some embodiments, the the output of the arbitrary predetermined document or paragraph vector generator determines the value of the vector attribute.

The present invention also provides for computer-implemented methods executed by one or more processors for generating component parts used in generating a Root Document Trace, comprising: creating, by an increment generator, an empty increment object; assigning, by the increment generator, a predetermined document identification number to the docID attribute and a nonnegative integer value to a position attribute of the increment object; capturing, by a frame object using the output of a text parser, a number of tokens equal to the size attribute of the frame object; generating, by an arbitrary predetermined document or paragraph vector generator using the captured tokens, a paragraph or document vector representing the captured text in semantic space; assigning, by the increment generator, start, end, and vector attribute values to the increment object; updating, by the increment generator, the frame object start and end attributes; and determining, by the increment generator from the collection of increment objects, whether there is a need to generate an additional increment object, and optionally generating one additional increment object as specified by the increment generator. In some embodiments the value of the position attribute of the increment object is equal to the number of increment objects with the same docID attribute value created by the increment generator immediately prior to the current increment object. In some embodiments all and only those tokens with index between the start and end attributes of the frame object (inclusive) are included in the collection of tokens said to be captured by the frame object. In some embodiments the input to the vector generator is a string comprising the captured tokens in index order. In some embodiments the assigned values of the start and end attributes of the increment object are equal to the start and end attributes of the frame object at the time of capture, and the value of the vector attribute of the increment object is determined by the output of the vector generator. In some embodiments the start and end attributes of the frame object each increase by a constant predetermined positive integer value strictly less than the value of the frame size attribute. And in some embodiments the determination by the increment generator regarding the need to create an additional increment is mediated by the end attribute value of the increment with greatest position attribute value.

The present invention also provides for computer-implemented methods executed by one or more processors for representing a document temporally in an arbitrary well-defined semantic space, the methods comprising: generating, by a text parser operating upon a plaintext document, an ordered list of tokens, wherein the order of tokens in the list corresponds precisely to their order in the document, and each token in the list has content in the form of a string and index in the form of a non-negative integer; defining, by a computational process, a frame object with attributes start, end, and size, and methods for retrieving start, end, and size attributes and altering start and end attributes; iteratively generating, by an increment generator using the frame object and the output of the text parser, a collection of increment objects possessing the same docID attribute value, wherein each iteration generates a single increment object through a process comprising: assigning, by the increment generator, a predetermined document identification number to the docID attribute and a nonnegative integer value to the position attribute of the increment object, wherein the value of the position attribute is equal to the number of increment objects created prior to the current increment; capturing, by the frame object using the output of the text parser, a number of tokens equal to the size attribute of the frame object, wherein all tokens with index between the start and end attributes of the frame object (inclusive) are included in the collection; generating, by an arbitrarily chosen vector generator using the captured tokens, a paragraph or document vector representing the captured text in semantic space, wherein the input to the vector generator is a string comprising the captured tokens in index order; assigning, by the increment generator, start and end attributes of the increment object corresponding to the start and end attributes of the frame object, and a vector value to the vector attribute of the increment object, wherein the output of the vector generator determines the value of this attribute; updating, by the increment generator, the frame object start and end attributes, wherein each attribute increases by a constant positive integer value strictly less than the value of the frame size attribute; determining, by the increment generator from the collection of increment objects, whether there is a need to generate an additional increment object, and optionally generating one additional increment object as specified by the increment generator; and generating, from the collection of increment objects by a function generator, a Root Document Trace. In some embodiments, the Root Document Trace is defined as an explicit bijection between the set of subsets of the nonnegative integers specified by the properties of the collection of increment objects and a set of vectors in the semantic space defined by the vector generator.

The present invention also provides for computer-implemented methods executed by one or more processors for representing a document temporally in an arbitrary well-defined semantic space, the methods comprising: generating, by a text parser operating upon a plaintext document, an ordered list of tokens, wherein the order of tokens in the list matches their order in the document, and each token in the list has content in the form of a string and index in the form of a non-negative integer; defining, by a computational process, a frame object with attributes start, end, and size, and methods for retrieving start, end, and size attributes and altering start and end attributes; iteratively generating, by an increment generator using the frame object and the output of the text parser, a collection of increment objects possessing identical docID attribute values; and generating, from the collection of increment objects, a Root Document Trace.

In some embodiments, the semantic space is defined by an arbitrary vector generator. In some embodiments, a function generator is used for generating, from the collection of increment objects, the explicit bijection between a subset of the nonnegative integers and a set of vectors in a semantic space.

In some embodiments, the Root Document Trace refers to the explicit bijection between the set of subsets of the nonnegative integers specified by the properties of the increment objects generated as described above and a set of vectors in the defined semantic space.

The present invention also provides for systems for representing a document temporally in an arbitrary well-defined semantic space, the systems comprising a memory storing processor executable instructions and one or more processors to: generate, by a text parser operating upon a plaintext document, an ordered list of tokens, wherein the order of tokens in the list corresponds precisely to their order in the document, and each token in the list has content in the form of a string and index in the form of a non-negative integer; define, by a computational process, a frame object with attributes start, end, and size, and methods for retrieving start, end, and size attributes and altering start and end attributes; iteratively generate, by an increment generator using the frame object and the output of the text parser, a collection of increment objects possessing the same docID attribute value, wherein each iteration generates a single increment object through a process to: assign, by the increment generator, a predetermined document identification number to the docID attribute and a nonnegative integer value to the position attribute of the increment object, wherein the value of the position attribute is equal to the number of increment objects created prior to the current increment; capture, by the frame object using the output of the text parser, a number of tokens equal to the size attribute of the frame object, wherein all tokens with index between the start and end attributes of the frame object (inclusive) are included in the collection; generate, by an arbitrarily chosen vector generator using the captured tokens, a paragraph or document vector representing the captured text in semantic space, wherein the input to the vector generator is a string comprising the captured tokens in index order; assign, by the increment generator, start and end attributes of the increment object corresponding to the start and end attributes of the frame object, and a vector value to the vector attribute of the increment object, wherein the output of the vector generator determines the value of this attribute; update, by the increment generator, the frame object start and end attributes, wherein each attribute increases by a constant positive integer value strictly less than the value of the frame size attribute; determine, by the increment generator from the collection of increment objects, whether there is a need to generate an additional increment object, and optionally generating one additional increment object as specified by the increment generator; and generate, from the collection of increment objects by a function generator, a Root Document Trace.

In some embodiments the Root Document Trace is an explicit bijection between the set of subsets of the nonnegative integers specified by the properties of the collection of increment objects and a set of vectors in the defined semantic space.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, devices, and disclosed. In addition, the drawings are not necessarily drawn to scale. In the drawings:

FIG. 1 illustrates an embodiment of the present invention directed to describing the initial conditions and anatomy of an increment as used herein;

FIG. 2 illustrates an embodiment of the present invention directed to describing Vectorization as used herein;

FIG. 3.1 illustrates an embodiment of the present invention directed to describing the Frame Shift Detail, as used herein;

FIG. 3.2 illustrates an embodiment of the present invention directed to describing the Frame Shift Overview, as used herein;

FIG. 4 illustrates an embodiment of the present invention directed to describing the Repetition of Procedure, as used herein;

FIG. 5 illustrates an embodiment of the present invention directed to describing Root and Second-Order Objects, as used herein;

FIG. 6 illustrates an embodiment of the present invention directed to describing the Drawing the Trace in k+1 Dimensions, as used herein;

FIG. 7 illustrates an embodiment of the present invention directed to describing the Drawing the Trace in k Dimensions, as used herein.

DETAILED DESCRIPTION OF ILLUSTRATIVE EMBODIMENTS

Figure 8:
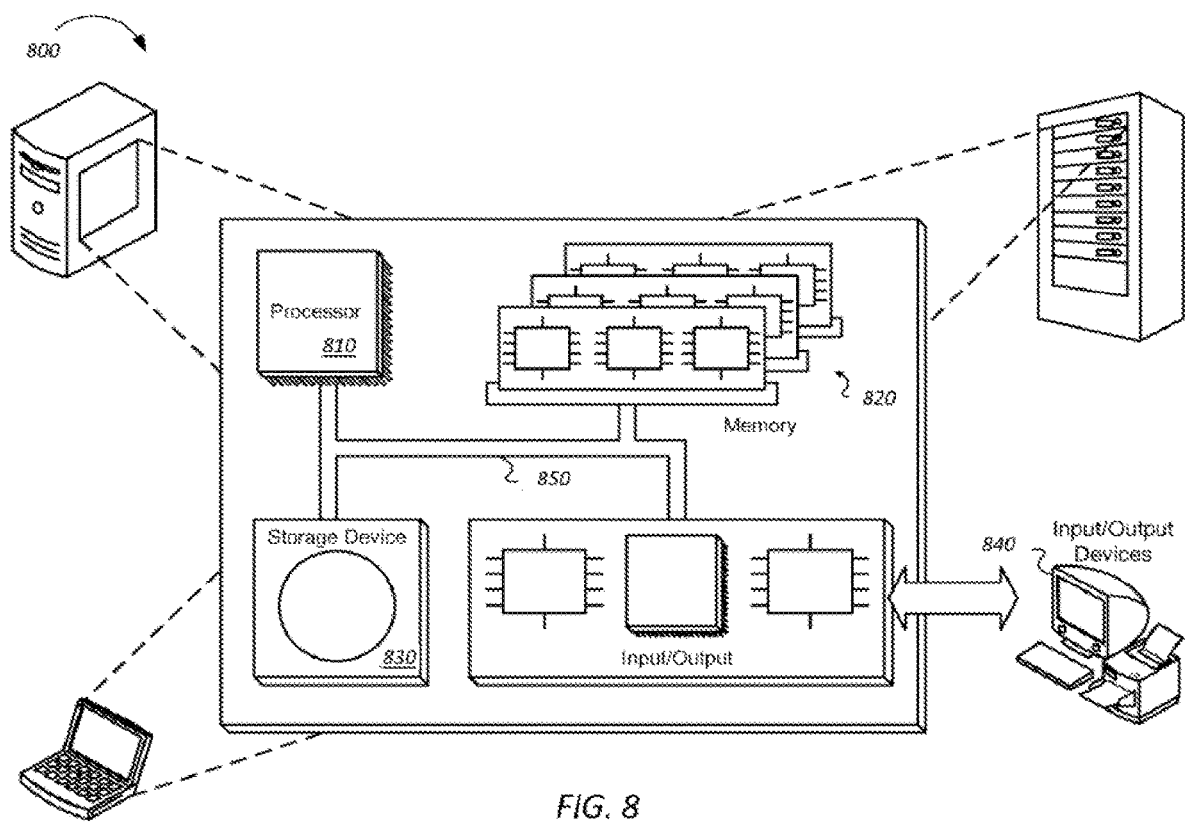
FIG. 8 is a schematic diagram of a generic computer system.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

Description of Procedure. We consider specifically the case of a generic text document, such as a journal article or short story. Other cases examine the document in abstract, as an unspecified but necessarily sequential presentation of information of any type.

Our input, as indicated above, is a generic text document. Our output is the Root Document Trace: a bijective function describing a trajectory through semantic space. Note that the Root Document Trace serves as a common ancestor to a variety of possible document-representing mathematical objects, discussed in greater detail in a later section.

We begin by viewing the document as a single unified stream of information, parsed as an ordered series of Tokens. Natural breaks in the text, such as new paragraphs, are, for the purpose of this process, considered to be tokens within the stream, but are not given any special treatment. Each token is assigned an index within the document as well, based on the preexisting ordering:

(T1) Token.index: a nonnegative integer (T2) Token.content: a string containing the content of the token.

We then define a Frame, which for the purposes of this procedure can be thought of as a movable window with capacity for a fixed number of tokens. The Frame object includes start, end, and size attributes, along with methods to retrieve each attribute and methods to update the start and end attributes. The pseudocode explicitly references the following methods:

(F1) Frame.getStart( ) returns the index of the first token in the frame;

(F2) Frame.getEnd( ) returns the index of the last token in the frame.

We refer to the set of tokens within the frame at any given time as an Increment and consider primarily that the frame is fixed-size and context-agnostic, meaning that it will give no special treatment to any given increment regardless of the increment's content. We also establish the following attributes:

(I1) Increment.docID: the hexadecimal identification number of the document from which the increment comes;

(I2) Increment.pos: a nonnegative integer indicating the increment's position (index) within the document;

(I3) Increment.start: the index of the first token in the increment;

(I4) Increment.end: the index of the last token in the increment;

(I5) Increment.vec: a vector representation of the increment as described below.

It should be noted that while the current version of this process explicitly does not factor the attributes of Increment i into the creation of Increment i+1, we do intend to explore the relative impact on the Trace of a recurring front-fixed "context" variable token generated from each previous Increment. Intuitively, such a modification renders this a more comprehensive approximation of the real-world cognitive process behind the model.

Our next step is to identify an existing embedding tool for arbitrary-length chunks of text. Any type of document or paragraph embedding tool can be used for this purpose, given that the semantic space our choice describes is reasonably well-defined and the tool is suited for use with documents of the relevant language and of size specified by our chosen Frame size. Suitable embedding tools for English-language text include, but are not limited to, Doc2Vec and Paragraph Vector. Notably, the applicability of this technology to text in a given language depends only on the availability of a suitable document or paragraph embedding tool for text in that language, and not on the specific process by which the document or paragraph vectors are generated, meaning that, for example, we may apply it to texts written in Mandarin as easily as to those written in English. We say that this embedding tool, whichever we choose, embeds in k dimensions.

Once such an embedding tool is chosen, the following process/algorithm is run on the document with initial conditions i=0 and some fixed n such that 0<n<Frame size (with optimal n to be determined through future experiment and likely derived from original choice of embedding):

```
(01) > while(frame end is within scope of document, i.e. not null):
(02) > Create new Increment object inc with:
(03) inc.docID = [value forthat document];
(04) inc.pos = i;
(05) inc.start = frame.getStart( ); and
(06) inc.end = frame.getEnd( );
   (07) > Create paragraph vector v_i from increment contents as specified, and
   (08) > Store v_i in inc.vec;
   (09) > Shift frame down n tokens;
   (10) > i++;
(11) > If last Increment object does not include final Token:
   (12) > Set frame.end to the final token index;
   (13) > frame.start = (frame.end − frame.size + 1);
   (14) > Create Increment object from this frame as described above;
```

In particular, note the restriction at line (09). Adjacent increments must contain a critical mass of shared material, and thus n will necessarily be smaller than our frame size. It is this feature that sets the resulting sequence apart from, say, a traditional time series segmentation.

At the completion of this process a sequence of k-dimensional vectors is generated. The pairings of these vectors with sets containing their respective indices in the sequence form our Root Document Trace: the explicit bijection from a specified subset of the power set $P(\mathbb{Z}^+)$ (a set of subsets of the nonnegative integers) to the set of inc.vec values. Note that all elements of the domain will be singleton sets unless the frame shift process captures two identical sections of text, which is possible but unlikely.

Sample Objects Within the Class. As mentioned above, the Root Document Trace serves as the common ancestor for a class of distinct computational objects representing the same document. This is illustrated in FIG. 5 below. In this section, we briefly outline a few such object types, referred to as "second-order objects," though this list is not exhaustive. Importantly, once we have established the Trace, the computational cost of operating upon multiple second-order objects simultaneously or in quick succession is far smaller than it would be in a collection of models lacking the common ancestor.

(1) Perhaps most naturally, we may plot each vector's target point T(i) in k+1-dimensional space and connect the points as demonstrated in FIG. 6 below to create a (k+1)-dimensional impression or unwinding of the Trace. Note that in this case, the potential additional Increment created in lines (11-14) of the pseudocode will distort the tail of the impression. If this is of concern, we may instead plot our target points in relation to their associated inc.start values, taking care to do so consistently for the entirety of the analysis.

(2) Plotting the vectors' target points in our previous k-dimensional space instead and drawing a continuous trajectory through these points in the order of their creation gives us a k-dimensional impression of the Trace, as demonstrated in FIG. 7 below. Though the explicit temporal dimension is lost here, the sequential relationships remain.

(3) We may alternately interpret the Trace's codomain as a preorder or poset—in fact, a total order—with relation determined by the natural ordering of the indexing set $\{inc.pos\} \subset \mathbb{Z}^+$ whenever all elements of the Trace's domain are singletons. This lends itself to a category-theoretic view as well; within this view, the Trace itself is a functor.

(4) As a final example, we may construct one of several explicit sequences of transformations (in the colloquial sense) that describe how we "move" between subsequent elements of the codomain. There are multiple approaches here worth pursuing; for our current purposes it suffices to consider the resulting sequence in the abstract.

Implications and Example Use Cases. In this section, we outline the most consequential implications of representing a document in this way and provide brief insight into a body of potential use cases that could not be realized under existing document representation paradigms.

Multipotential Modeling: As mentioned previously, the Root Document Trace provides a foundation for multiple avenues of inquiry stemming from a single resource-intensive process, which streamlines the process of innovation and discovery in the document-processing space (FIG. 5).

Emergent Understanding through Simultaneous Multimodal Analysis: The shared up-front computational cost makes feasible the exploration of possible emergent effects seen only in the context of simultaneous or combined analysis of second-order objects.

Geometric Analysis of Narrative Drift: Without knowing anything about the content of a given document, the Trace's shape alone allows us to determine whether or not it deviates abnormally from a spatially ideal semantic path between two non-adjacent points.

Analysis of Convergence and Divergence Points: Again without knowing anything about content, we can determine where (and theoretically how) two or more documents diverge semantically. We can furthermore determine the nature of this divergence (temporary, parallel, or compounding) and process the documents' content accordingly. Potential use cases include:

Automated Multi-Document Content Integration: Rather than reading the same information repeatedly within different documents in the hopes of finding something new, we can automatically create a single composite document comprising the content of a single kernel Trace as well as all content corresponding to the points after which other Traces in the system diverge from the kernel.

Novelty Determination: Easily identify documents that deviate meaningfully from an established pattern. Useful in search—increases signal to noise ratio and better allows users to locate desired content.

Early Identification of Potential Collaborator Relationships: Similarities and convergences between Traces may indicate a potentially beneficial collaborative relationship between the parties responsible for the documents being analyzed. The organic identification of such relationships is limited; it need not be.

Analysis of Subsection Geometry: Similar substructures correspond to similar lines of reasoning in a well-defined semantic space. Using this property, we are theoretically able to identify documents that make use of particular forms of argument. While we have primarily considered the classical text document here, this particular property holds major implications for documents containing explicit algorithmic or procedural information such as written code and mathematical proofs.

Implications for Machine Learning Systems:

Improved Global Coherence in Natural Language Processing: The explicitly ordered nature of the Trace provides a strong foundation for global coherence in any model making use of it. Global coherence is to date one of the field's most prominent failure modes.

Convergent Extrapolation for Natural Language Systems: The second-order object type (4) above suggests that we may be able to make use of analytic methods in mathematics to bolster the extrapolative capabilities of our natural language systems.

This is not a comprehensive list of implications by any means; it primarily serves to show the versatility and importance of the Trace as a tool.

Referring now to the drawings, in which like numerals represent like elements, various aspects of the present invention will be described. The drawings and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, servers, cloud-based servers, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to FIG. 1, this figure demonstrates the initial conditions upon which the algorithm will operate and the Increment object produced by the algorithm. We begin with a generic text document of arbitrary length (102) parsed into tokens (106), which has a unique hexadecimal identifier (114). We define a Frame (108), whose exact size is determined by the user but should generally fall between 30 and 180 tokens. We position the Frame at the beginning of the document such that the first token in the Frame is the first token in the document (104). At this time, the method Frame.getStart( ) (124) will return 0, the index of the first token in the document and thus in the Frame (126), and the method Frame.getEnd( )(128) will return the index of the last token in the Frame (130), which will be equal to one less than the Frame size. In our example, the Frame size is 32; thus this value is 31.

The Increment (110) as described in pseudocode line (02) has the following simple attributes as described in pseudocode lines (03-06):

inc.docID (112), which is the document identifier (114);
inc.pos (116), which is the creation index of the Increment, starting at 0; and inc.start (118) and inc.end (120), populated by calls (122) to Frame.getStart( ) (124) and Frame.getEnd( ) (128).

The attribute inc.vec (132) is initially empty and is populated as described in FIG. 2.

FIG. 2 demonstrates the creation and storage of a single Increment's vector. Beginning with our first sample Increment (202) populated as described in FIG. 01, we choose an embedding tool (204) such as Doc2Vec. Taking the portion of the document visible within our Frame (206) as the input text, we run the tool (208) to produce a unique vector representing the content of the Frame (210). We then populate the inc.vec attribute of our initial Increment with this result (212).

FIG. 3.1 demonstrates the effect of shifting a generic Frame (302) as described in pseudocode line (09) with an example n of 3 and Frame size 32. In the initial state, our Frame's first Token has index k (304) and thus Frame.getStart( ) will return k; its last Token has index k+31 (306) and thus Frame.getEnd( ) will return k+31. We update the Frame start (308) and end (310) attributes according to pseudocode line (09). After shifting, the Frame (312) contains some but not all of the Tokens present in its initial state as well as several Tokens not present initially. The first Token in the shifted Frame is the one with index k+3 (314), while the final Token has index k+34 (316). Regardless of these changes, the size of the Frame (318, 320) does not change.

FIG. 3.2 illustrates a high-level, intuitive overview of the Frame shift process described in detail in FIG. 3.1. The Frame (326) moves linearly along the sequence (322) with consistent Frame shift n such that 0<n<Frame size (330). Each shift of the Frame defines a new Increment (328) consisting of a constant number of Tokens (324).

FIG. 4 demonstrates the continuation and completion of the algorithm defined by pseudocode lines (01) through (10). The figure shows three sample Increment objects (402, 404, 406) from the same document possessing specific inc.pos values. Note that the inc.start and inc.end values for the jth Increment (408) are determined using the same sample Frame size and Frame shift as in FIG. 3.1. We perform our chosen embedding protocol (410) on each Increment (412, 414, 416) to create a resulting vector (418, 420, 422), which we then store in the Increment's inc.vec attribute (424, 426, 428). The process is identical regardless of the Increment's position attribute, as illustrated.

FIG. 5 outlines the broad shape of the relationship between the Root Document Trace (502), its second-order objects (504), and the associated implications of their use in document processing. Though the primitive root form of the Trace has its own potential use cases (506), much of its impact comes from the implications of the associated individual second-order objects (508) as well as those emerging from the interaction of two or more second-order objects (510).

FIG. 6 provides a low-dimensional sketch of the process by which we form the k+1-dimensional impression, or unwinding, of the Trace. We begin with the inc.vec value corresponding to inc.pos 0 (602), which we plot in k+1-dimensional space represented here with our original k-dimensional space projected along the y-axis and the added dimension of chronology along the t-axis (604). The tail of this vector lies at the corresponding inc.pos value on the t-axis, which is 0 (606). We repeat this process for the Increment with inc.pos 1 (608), with the tail of the corresponding vector now at t=inc.pos=1 (612) and no change to the coordinate system (610). We repeat for all subsequent Increments, such that the inc.vec value corresponding to inc.pos j (614) is plotted, again in the same coordinate system (616), with tail at t=inc.pos=j (618). Again in the same coordinate system (620), we draw a continuous curve (630) through the target points of our plotted vectors (622, 624, 626), with the break in the graph (628) serving only to demonstrate visually that the resulting impression may extend far along the t-axis. Though this is the most natural method of building the impression, we may substitute inc-.start values for inc.pos values as described in an above section if distortion is of concern. In this case, vector $v_j$ originates at the value t=inc.start for the Increment with inc.pos=j.

FIG. 7 provides a low-dimensional sketch of the process by which we form the k-dimensional impression of the Trace. In many ways, this process is similar to the one described in FIG. 6 above, but there are several key differences. Each Increment's vector (702, 708, 714) is placed in the original k-dimensional semantic space (704, 710, 716) of the embedding, always beginning at the origin (706, 712, 718). Our desired result (720) is a continuous path through this semantic space (722). Like above, we draw a continuous trajectory passing through the vectors' target points in their order of creation (724). We begin with the vector corresponding to inc.pos=0 (726), then move onto the vector corresponding to inc.pos=1 (728), and onward until we hit the vector corresponding to inc.pos=j (730), etc. Observe that the path between our first two points (732) has minimal curvature, since the associated Increments are adjacent in the order. Observe in contrast that the path between $v_2$ and $v_j$ (734) varies significantly. Note that the tail of the path (736) serves simply as a visual indicator that there may be more than j-many Increments to consider when forming the impression.

FIG. 8 is a schematic diagram of a generic computer system 800. The system 800 can be used for practicing operations described, for example in association with the methods described herein. The system 800 can include a processor 810, a memory 820, a storage device 830, and input/output devices 840. Each of the components 810, 820, 830, and 840 are interconnected using a system bus 880. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840. The memory 820 is a computer readable medium such as volatile or non-volatile that stores information within the system 800. The storage device 830 is capable of providing persistent storage for the system 800. The storage device 830 may be a floppy disk device, a hard disk device, an optical disk device, or a tape device, or other suitable persistent storage means. The input/output device 840 provides input/output operations for the system 800. In one implementation, the input/output device 840 includes a keyboard and/or pointing device. In another implementation, the input/output device 840 includes a display unit for displaying graphical user interfaces. Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The disclosures of each patent, patent application, and publication cited or described in this document are hereby incorporated herein by reference, in its entirety. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

Clause 1. A computer-implemented method executed by one or more processors for representing a document temporally in an arbitrary well-defined semantic space, the method comprising: generating, by a text parser operating upon a plaintext document, an ordered list of tokens, wherein the order of tokens in the list matches their order in the document, and each token in the list has content in the form of a string and index in the form of a non-negative integer; defining, by a computational process, a frame object with attributes start, end, and size, and methods for retrieving start, end, and size attributes and altering start and end attributes; iteratively generating, by an increment generator using the frame object and the output of the text parser, a collection of increment objects possessing the same docID attribute value, wherein each iteration generates a single increment object through a process comprising: assigning, by the increment generator, a predetermined document identification number to the docID attribute and a nonnegative integer value to the position attribute of the increment object, wherein the value of the position attribute is equal to the number of increment objects created prior to the current increment; capturing, by the frame object using the output of the text parser, a number of tokens equal to the size attribute of the frame object, wherein all tokens with index between the start and end attributes of the frame object (inclusive) are included in the collection; generating, by an arbitrarily chosen vector generator using the captured tokens, a paragraph or document vector representing the captured text in semantic space, wherein the input to the vector generator is a string comprising the captured tokens in index order; assigning, by the increment generator, start and end attributes of the increment object corresponding to the start and end attributes of the frame object, and a vector value to the vector attribute of the increment object, wherein the output of the vector generator determines the value of this attribute; updating, by the increment generator, the frame object start and end attributes, wherein each attribute increases by a constant positive integer value strictly less than the value of the frame size attribute; determining, by the increment generator from the collection of increment objects, whether there is a need to generate an additional increment object, and optionally generating one additional increment object as specified by the increment generator; and generating, from the collection of increment objects by a function generator, a Root Document Trace.

Clause 2. The method of Clause 1, wherein the Root Document Trace is defined as an explicit bijection between the set of subsets of the nonnegative integers specified by the properties of the collection of increment objects and a set of vectors in the semantic space defined by the vector generator.

Clause 3. A computer-implemented method executed by one or more processors for representing a document temporally in an arbitrary well-defined semantic space, comprising: generating, by a text parser operating upon a plaintext document, an ordered list of tokens, wherein the order of tokens in the list matches their order in the document, and each token in the list has content in the form of a string and index in the form of a non-negative integer; defining, by a computational process, a frame object with attributes start, end, and size, and methods for retrieving start, end, and size attributes and altering start and end attributes; iteratively generating, by an increment generator using the frame object and the output of the text parser, a collection of increment objects possessing identical docID attribute values, generating, from the collection of increment objects, a Root Document Trace.

Clause 4. The method of Clause 3, wherein the semantic space is defined by an arbitrary vector generator.

Clause 5. The method of Clause 3, wherein a function generator is used for generating, from the collection of increment objects, the Root Document Trace.

Clause 6. The method of Clause 3, wherein the Root Document Trace is an explicit bijection between a set of subsets of the nonnegative integers specified by the properties of the increment objects and a set of vectors in the defined semantic space.

Clause 7. A computer-implemented method executed by one or more processors for generating a document-representing object in an arbitrary well-defined semantic space, comprising: receiving, by a data processing system, a plaintext document in a specified language; and constructing an explicit bijection between a specified set of subsets of the nonnegative integers and a set of vectors in a semantic space.

Clause 8. The method of Clause 7, wherein the set of subsets of the nonnegative integers is defined by an iterative process performed upon the document.

Clause 9. The method of Clause 7, wherein the semantic space is defined by an arbitrary document or paragraph vector generator suited to the specified language of the document.

Clause 10. A computer-implemented method executed by one or more processors for representing a document temporally in an arbitrary well-defined semantic space, comprising: generating, by a text parser operating upon a plaintext document, an ordered list of tokens; defining, by a computational process, a frame object with assigned attributes and object methods; iteratively generating, by an increment generator using the frame object and the output of the text parser, a collection of increment objects possessing identical docID attribute values; and generating, from the collection of increment objects, a Root Document Trace.

Clause 11. The method of Clause 10, wherein the semantic space is defined by an arbitrary vector generator.

Clause 12. The method of Clause 10, wherein the attributes of each increment object are calculated by an increment generator from the position of the frame object in relation to the ordered list of tokens.

Clause 13. The method of Clause 10, wherein the step of iteratively generating a collection of increment objects uses a consistent predetermined frame shift.

Clause 14. The method of claim Clause, wherein the attributes of each increment object are calculated by the increment generator, using a vector generator, from the position of the frame object in relation to the list of tokens.

Clause 15. The method of Clause 10, wherein the Root Document Trace is an explicit bijection between the set of subsets of the nonnegative integers specified by the properties of the collection of increment objects and a set of vectors in the defined semantic space.

Clause 16. A computer-implemented method executed by one or more processors for representing a document temporally in an arbitrary well-defined semantic space, the method comprising: generating, by a text parser operating upon a plaintext document, an ordered list of tokens, wherein the order of tokens in the list matches their order in the document, and each token in the list has content in the form of a string and index in the form of a non-negative integer; defining, by a computational process, a frame object with attributes start, end, and size, and methods for retrieving start, end, and size attributes and altering start and end attributes; iteratively generating, by an increment generator using the frame object and the output of the text parser, a collection of increment objects possessing identical docID attribute values; and generating, from the collection of increment objects, a Root Document Trace.

Clause 17. The method of Clause 16, wherein the semantic space is defined by an arbitrary vector generator.

Clause 18. The method of Clause 16, wherein a function generator is used for generating, from the collection of increment objects, the explicit bijection between a subset of the nonnegative integers and a set of vectors in a semantic space.

Clause 19. The method of Clause 16, wherein the Root Document Trace refers to the explicit bijection between the set of subsets of the nonnegative integers specified by the properties of the increment objects generated as described above and a set of vectors in the defined semantic space.

Clause 20. A computer-implemented method executed by one or more processors for generating component parts used in constructing a Root Document Trace, comprising: generating, by an increment generator, an empty increment object; assigning, by the increment generator, a predetermined document identification number to a docID attribute and a nonnegative integer value to a position attribute of the increment object, wherein the value of the position attribute is equal to the number of increment objects with the same docID attribute value created prior to the current increment; capturing, by a frame object using the output of a text parser, a number of tokens equal to the size attribute of the frame object, wherein all and only those tokens with index between the start and end attributes of the frame object (inclusive) are included in the collection; generating, by an arbitrary predetermined document or paragraph vector generator using the captured tokens, a paragraph or document vector representing the captured text in semantic space, wherein the input to the arbitrary predetermined document or paragraph vector generator is a string comprising the captured tokens in index order; assigning, by the increment generator, start and end attributes of the increment object corresponding to the start and end attributes of the frame object and a vector value to a vector attribute of the increment object; updating, by the increment generator, the frame object start and end attributes, wherein each attribute increases by a constant positive integer value strictly less than the value of the frame size attribute; and determining, by the increment generator from the collection of increment objects, whether there is a need to generate an additional increment object, and optionally generating one additional increment object as specified by the increment generator.

Clause 21. The method according to Clause 20, wherein the output of the arbitrary predetermined document or paragraph vector generator determines the value of the vector attribute.

Clause 22. A computer-implemented method executed by one or more processors for generating component parts used in generating a Root Document Trace, comprising: creating, by an increment generator, an empty increment object; assigning, by the increment generator, a predetermined document identification number to the docID attribute and a nonnegative integer value to a position attribute of the increment object; capturing, by a frame object using the output of a text parser, a number of tokens equal to the size attribute of the frame object; generating, by an arbitrary predetermined document or paragraph vector generator using the captured tokens, a paragraph or document vector representing the captured text in semantic space; assigning, by the increment generator, start, end, and vector attribute values to the increment object; updating, by the increment generator, the frame object start and end attributes; and determining, by the increment generator from the collection of increment objects, whether there is a need to generate an additional increment object, and optionally generating one additional increment object as specified by the increment generator.

Clause 23. The method of Clause 22, wherein the value of the position attribute of the increment object is equal to the number of increment objects with the same docID attribute value created by the increment generator immediately prior to the current increment object.

Clause 24. The method of Clause 22, wherein all and only those tokens with index between the start and end attributes of the frame object (inclusive) are included in the collection of tokens said to be captured by the frame object.

Clause 25. The method of Clause 22, wherein the input to the vector generator is a string comprising the captured tokens in index order.

Clause 26. The method of Clause 22, wherein the assigned values of the start and end attributes of the increment object are equal to the start and end attributes of the frame object at the time of capture, and the value of the vector attribute of the increment object is determined by the output of the vector generator.

Clause 27. The method of Clause 22, wherein the start and end attributes of the frame object each increase by a constant predetermined positive integer value strictly less than the value of the frame size attribute.

Clause 28. The method of Clause 22, wherein the determination by the increment generator regarding the need to create an additional increment is mediated by the end attribute value of the increment with greatest position attribute value.

Clause 29. A system for representing a document temporally in an arbitrary well-defined semantic space, the system comprising a memory storing processor executable instructions and one or more processors to: generate, by a text parser operating upon a plaintext document, an ordered list of tokens, wherein the order of tokens in the list matches their order in the document, and each token in the list has content in the form of a string and index in the form of a non-negative integer; define, by a computational process, a frame object with attributes start, end, and size, and methods for retrieving start, end, and size attributes and altering start and end attributes; iteratively generate, by an increment generator using the frame object and the output of the text parser, a collection of increment objects possessing identical docID attribute values, wherein each iteration generates a single increment object through a process to: assign, by the increment generator, a predetermined document identification number to the docID attribute and a nonnegative integer value to the position attribute of the increment object, wherein the value of the position attribute is equal to the number of increment objects created prior to the current increment; capture, by the frame object using the output of the text parser, a number of tokens equal to the size attribute of the frame object, wherein all tokens with index between the start and end attributes of the frame object (inclusive) are included in the collection; generate, by an arbitrarily chosen vector generator using the captured tokens, a paragraph or document vector representing the captured text in a semantic space, wherein the input to the vector generator is a string comprising the captured tokens in index order; assign, by the increment generator, start and end attributes of the increment object corresponding to the start and end attributes of the frame object, and a vector value to the vector attribute of the increment object, wherein the output of the vector generator determines the value of this attribute; update, by the increment generator, the frame object start and end attributes, wherein each attribute increases by a constant positive integer value strictly less than the value of the frame size attribute; determine, by the increment generator from the collection of increment objects, whether there is a need to generate an additional increment object, and optionally generating one additional increment object as specified by the increment generator; and generate, from the collection of increment objects by a function generator, a Root Document Trace.

Clause 30. The system of Clause 29, wherein the Root Document Trace is an explicit bijection between the set of subsets of the nonnegative integers specified by the properties of the collection of increment objects and a set of vectors in the defined semantic space.

What is claimed:

1. A computer-implemented method executed by one or more processors for representing a document temporally in an arbitrary well-defined semantic space, the method comprising:

generating, by a text parser operating upon a plaintext document, an ordered list of tokens, wherein the order of tokens in the list matches their order in the document, and each token in the list has content in the form of a string and index in the form of a non-negative integer;

defining, by a computational process, a frame object with attributes start, end, and size, and methods for retrieving start, end, and size attributes and altering start and end attributes;

iteratively generating, by an increment generator using the frame object and the output of the text parser, a collection of increment objects possessing the same docID attribute value, wherein each iteration generates a single increment object through a process comprising:

assigning, by the increment generator, a predetermined document identification number to the docID attribute and a nonnegative integer value to the position attribute of the increment object, wherein the value of the position attribute is equal to the number of increment objects created prior to the current increment;

capturing, by the frame object using the output of the text parser, a number of tokens equal to the size attribute of the frame object, wherein all tokens with index between the start and end attributes of the frame object (inclusive) are included in the collection;

generating, by an arbitrarily chosen vector generator using the captured tokens, a paragraph or document vector representing the captured text in semantic space, wherein the input to the vector generator is a string comprising the captured tokens in index order;

assigning, by the increment generator, start and end attributes of the increment object corresponding to the start and end attributes of the frame object, and a vector value to the vector attribute of the increment object, wherein the output of the vector generator determines the value of this attribute;

updating, by the increment generator, the frame object start and end attributes, wherein each attribute increases by a constant positive integer value strictly less than the value of the frame size attribute;

determining, by the increment generator from the collection of increment objects, whether there is a need to generate an additional increment object, and optionally generating one additional increment object as specified by the increment generator; and generating, from the collection of increment objects by a function generator, a Root Document Trace.

2. The method of claim 1, wherein the Root Document Trace is defined as an explicit bijection between the set of subsets of the nonnegative integers specified by the properties of the collection of increment objects and a set of vectors in the semantic space defined by the vector generator.

3. A computer-implemented method executed by one or more processors for representing a document temporally in an arbitrary well-defined semantic space, comprising:

generating, by a text parser operating upon a plaintext document, an ordered list of tokens;

defining, by a computational process, a frame object with assigned attributes and object methods;

iteratively generating, by an increment generator using the frame object and the output of the text parser, a collection of increment objects possessing identical docID attribute values; and generating, from the collection of increment objects, a Root Document Trace.

4. The method of claim 3, wherein the semantic space is defined by an arbitrary vector generator.

5. The method of claim 3, wherein the attributes of each increment object are calculated by an increment generator from the position of the frame object in relation to the ordered list of tokens.

6. The method of claim 3, wherein the step of iteratively generating a collection of increment objects uses a consistent predetermined frame shift.

7. The method of claim 3, wherein the attributes of each increment object are calculated by the increment generator, using a vector generator, from the position of the frame object in relation to the list of tokens.

8. The method of claim 3, wherein the Root Document Trace is an explicit bijection between the set of subsets of the nonnegative integers specified by the properties of the collection of increment objects and a set of vectors in the defined semantic space.

9. A computer-implemented method executed by one or more processors for generating component parts used in generating a Root Document Trace, comprising:

creating, by an increment generator, an empty increment object;

assigning, by the increment generator, a predetermined document identification number to the docID attribute and a nonnegative integer value to a position attribute of the increment object;

capturing, by a frame object using the output of a text parser, a number of tokens equal to the size attribute of the frame object;

generating, by an arbitrary predetermined document or paragraph vector generator using the captured tokens, a paragraph or document vector representing the captured text in semantic space;

assigning, by the increment generator, start, end, and vector attribute values to the increment object;

updating, by the increment generator, the frame object start and end attributes; and determining, by the increment generator from the collection of increment objects, whether there is a need to generate an additional increment object, and optionally generating one additional increment object as specified by the increment generator.

10. The method of claim 9, wherein the value of the position attribute of the increment object is equal to the number of increment objects with the same docID attribute value created by the increment generator immediately prior to the current increment object.

11. The method of claim 9, wherein all and only those tokens with index between the start and end attributes of the frame object (inclusive) are included in the collection of tokens said to be captured by the frame object.

12. The method of claim 9, wherein the input to the vector generator is a string comprising the captured tokens in index order.

13. The method of claim 9, wherein the assigned values of the start and end attributes of the increment object are equal to the start and end attributes of the frame object at the time of capture, and the value of the vector attribute of the increment object is determined by the output of the vector generator.

14. The method of claim 9, wherein the start and end attributes of the frame object each increase by a constant predetermined positive integer value strictly less than the value of the frame size attribute.

15. The method of claim 9, wherein the determination by the increment generator regarding the need to create an additional increment is mediated by the end attribute value of the increment with greatest position attribute value.

* * * * *